Sept. 7, 1965   J. H. SAGARIAN   3,204,491
MACHINES FOR SHARPENING SAWS
Filed Oct. 31, 1963   5 Sheets-Sheet 4
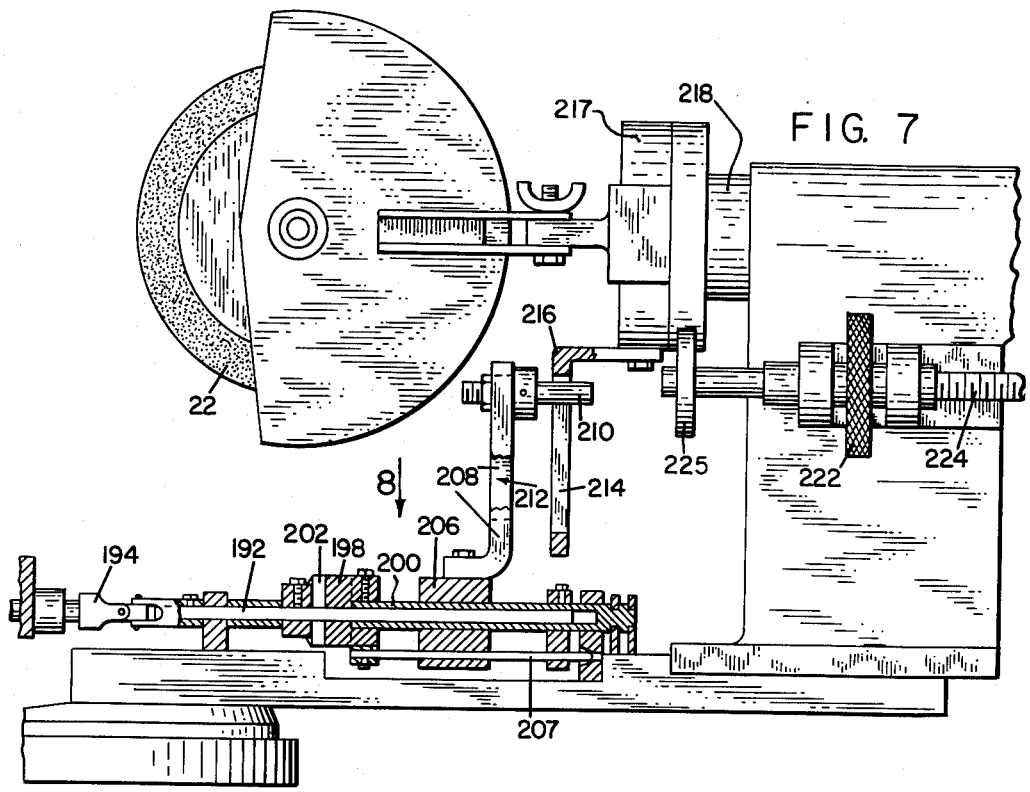
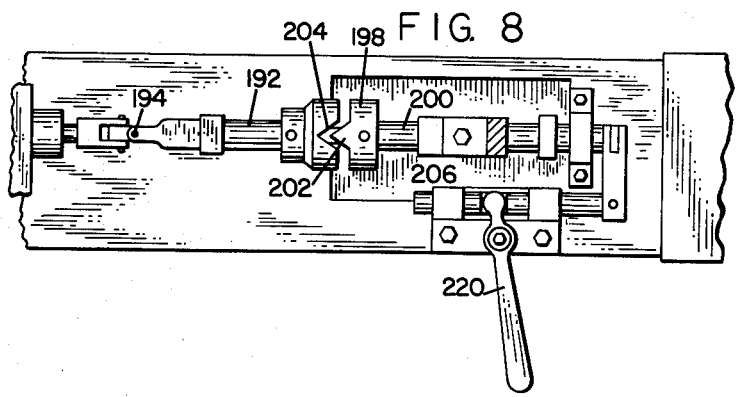
INVENTOR
JOHN H. SAGARIAN
BY *Charles R. Fay*
ATTORNEY

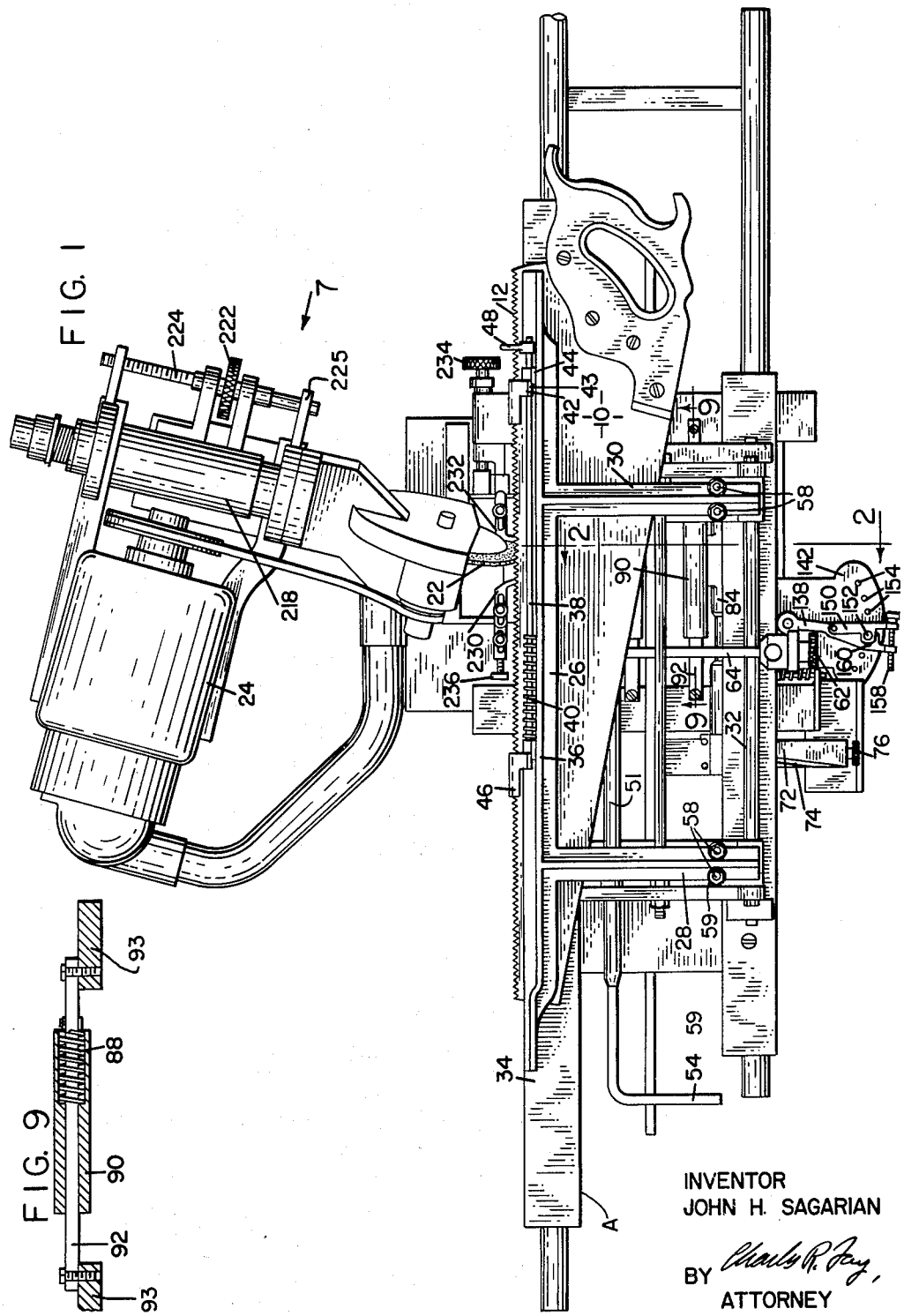

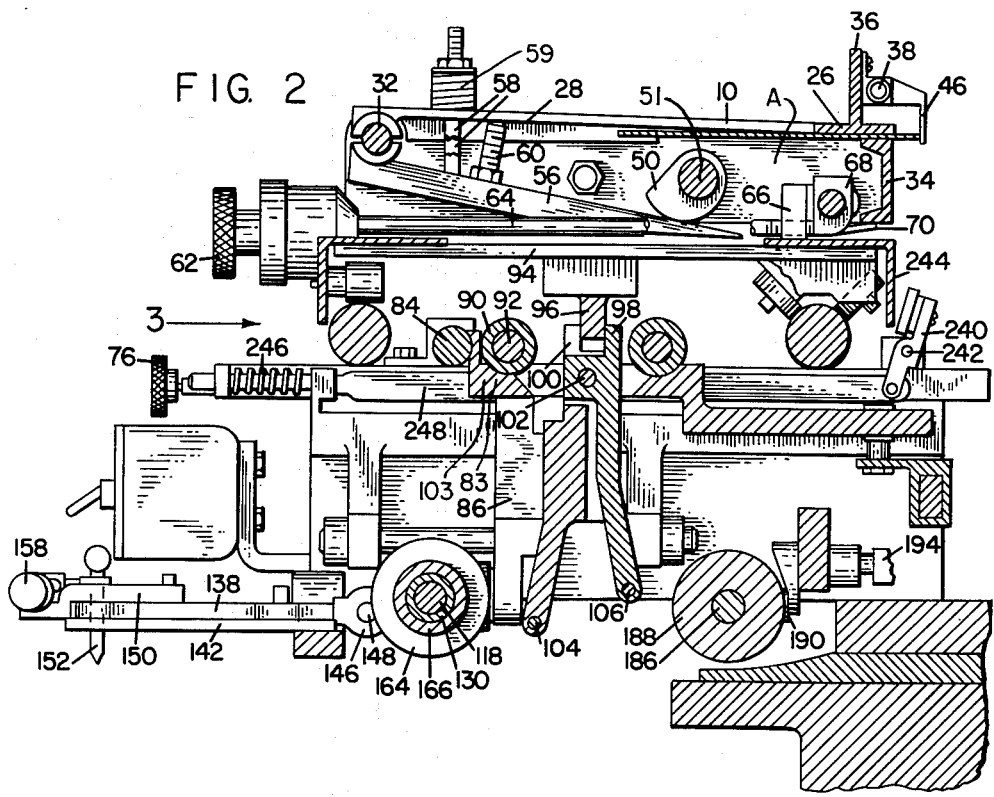
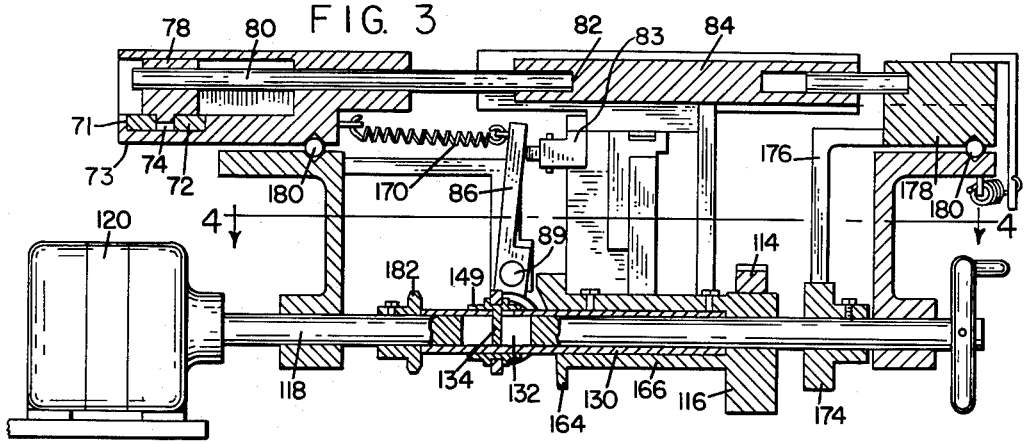

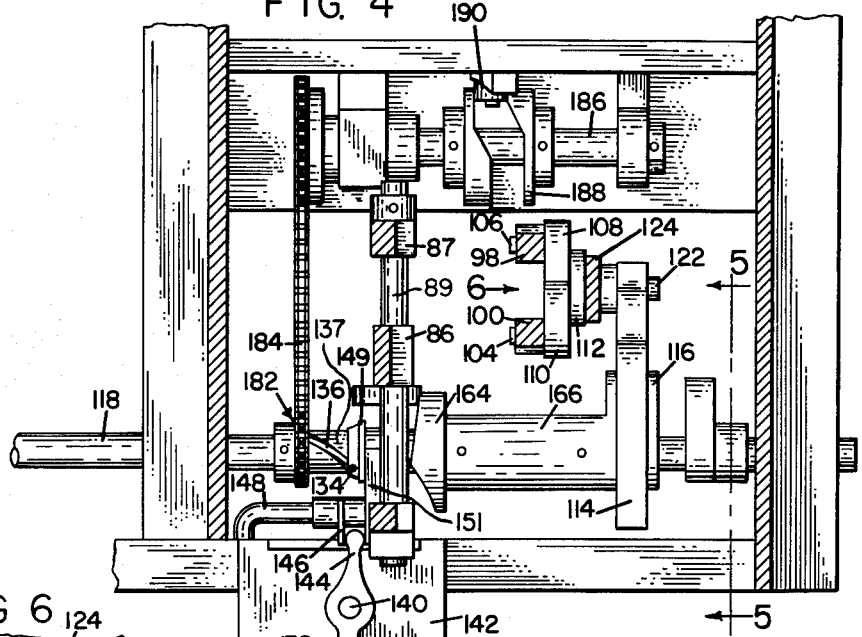

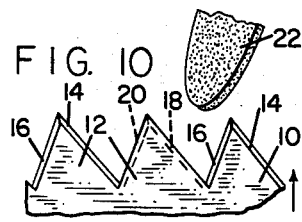
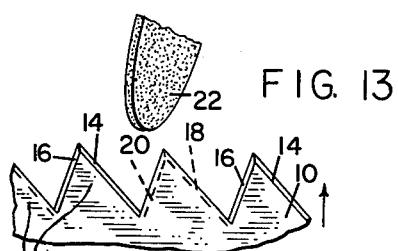
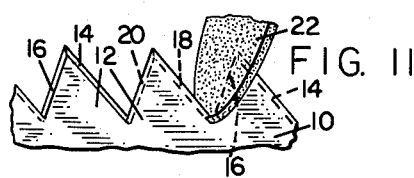
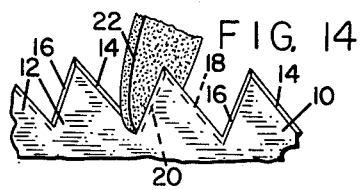
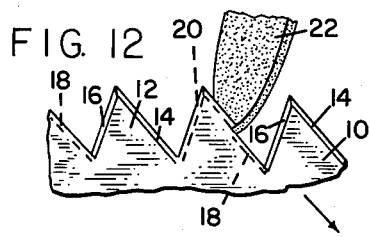
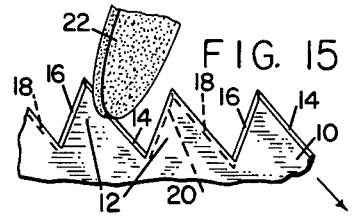
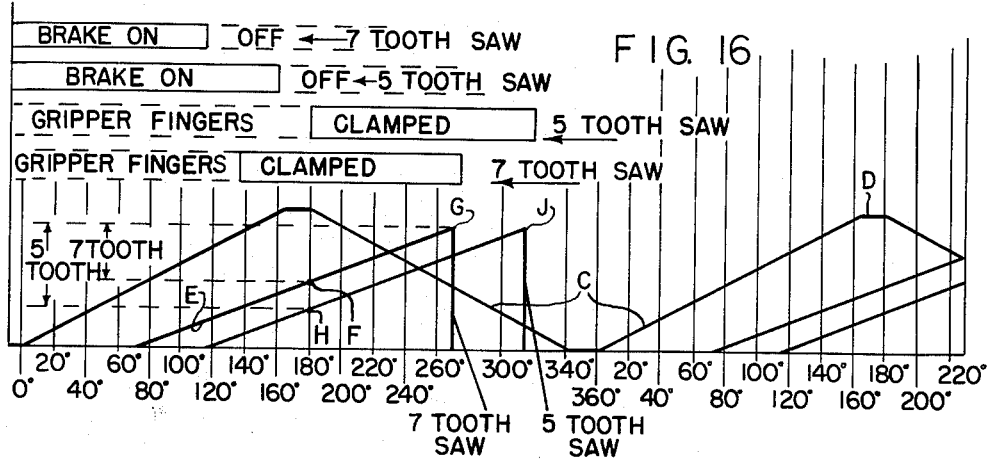

United States Patent Office 3,204,491
Patented Sept. 7, 1965

3,204,491
MACHINES FOR SHARPENING SAWS
John H. Sagarian, 43 Chandler St., Worcester, Mass.
Filed Oct. 31, 1963, Ser. No. 320,330
17 Claims. (Cl. 76—43)

This invention relates to machines for sharpening saws, particularly those having set teeth which have been worn under conditions of actual use, and the principal object of the invention resides in the provision of a saw sharpening machine providing a more accurately adjustable machine for any tooth size or pitch and in which beveled cutting teeth such as crosscut teeth are continuously abraded for instance starting with the forward face of one tooth upon which the bevel is ground and then grinding the oppositely extending bevel at the rear surface of the following tooth, i.e., in the direction of travel of the saw past the sharpening tool while preventing any damage or deformation of the tool while the same is being sharpened.

Further objects of the invention include new and improved means for advancing the saw tooth-by-tooth so as to accurately register at all times with the abrading tool used for sharpening the edges of the tooth; and to simplify and make automatic the work of sharpening the teeth and to increase the speed and effectiveness of operation regardless of the pitch of the teeth; and the provision of means providing for extremely accurate but quickly varied adjustments to vary the length of sharpening stroke, i.e., into the gullets of the teeth; to adjust the desired pitch; and the provision of a new and improved guide means to align the saw on a carriage which is step-by-step advanced in order to perform the sharpening operation in a single pass of the saw past the abrading tool.

Further objects of the invention include the provision for continuously and very minutely adjusting both the degree of penetration of the sharpening tool into the gullets of the teeth and to minutely and continuously adjust the timing of the saw advancing mechanism controlling the amount of the advance in each step to in turn control or to conform to the pitch of the teeth being sharpened.

Another object of the invention resides in the provision of a new and improved grip and release mechanism for moving the carriage upon which the saw is mounted relative to a sharpening tool, this grip and release mechanism being substantially infinitely adjustable within the range of the machine for the purpose of providing motion of the carriage and therefore of the saw to and from the sharpening tool and also in a saw-advancing direction during the operative action of the tool, whereby the face of one tooth is sharpened on the motion of the saw in a direction toward the tool, whereas on the reverse motion the rearward edge of the next tooth is sharpened, so that the machine sharpens all of the teeth at both edges thereof in one pass of the saw through the machine.

Other objects of the invention include the provision of certain novel elements and combinations of parts as will be hereinafter described, particularly with a view toward providing for simplicity of holding the saw correctly in the correct alignment with the sharpening tool and performing the adjustments above described quickly and easily so as to provide for extreme versatility as well as accuracy of the saw sharpening machine herein, and more particularly to the special problem of accurately sharpening crosscut saw teeth with respect to the bevels on said teeth, both on the leading faces and rearward faces thereof as will be explained hereinafter.

The invention further relates to arrangements and combinations of parts which will be hereinafter described and more particularly set forth in the appended claims.

Reference is to be had to the accompanying drawings, in which:

FIG. 1 is a plan view illustrating the machine;
FIG. 2 is an enlarged sectional view on line 2—2 of FIG. 1;
FIG. 3 is a view in side elevation, generally looking in the direction of arrow 3 in FIG. 2 and having parts broken away and in section;
FIG. 4 is a sectional view on line 4—4 of FIG. 3;
FIG. 5 is a section on line 5—5 of FIG. 4;
FIG. 6 is a view in elevation, looking in the direction of arrow 6 in FIG. 4;
FIG. 7 is a view in elevation showing the sharpening tool and its adjustment constructions, parts being in section;
FIG. 8 is a plan view with parts in section, looking in the direction of arrow 8 in FIG. 7;
FIG. 9 is a section on line 9—9 of FIG. 1 on an enlarged scale;
FIGS. 10, 11, 12, 13, 14 and 15 are diagrammatic views which illustrate the action of the sharpening tool, and
FIG. 16 is a cam diagram showing the operation of the machine.

Referring now to FIG. 1, a saw to be sharpened is indicated in general by the reference numeral 10. To illustrate the invention the saw is shown as provided with crosscut or rip teeth 12. These teeth as shown in FIGS. 10, et seq., are provided with cutting bevels as at 14, 16, 18 and 20, it being noted that the bevels 14 and 16 on one tooth 12 face in one direction while the bevels 18 and 20 on the adjacent tooth face in the opposite direction. The cutting tool itself in an abrasive disc and is indicated by the reference numeral 22. This disc is provided with the usual guard, driving mechanism, motor, etc. as generally indicated by the reference numeral 24 and the drive, adjustments, etc. for this tool will be hereinafter described. The motor can be provided with a pump and deritus collection means if desired.

Again referring to FIG. 1, the saw 10 is clamped to a carriage A to be described by a member having a main clamping portion 26 which is elongated and extends generally along the length of the blade 10. This elongated member 26 is provided with two transverse legs 28 and 30 which are in general pivotally mounted on a rod 32 which extends longitudinally of the machine, and it will be seen that the elongated element 26 extending longitudinally of the machine clamps the saw blade 10 adjacent its teeth in position against an elongated support on the carriage as indicated at 34 in FIG. 2. This support extends longitudinally of the machine also and it will be seen that the saw to be sharpened is firmly supported adjacent the teeth.

The longitudinal member 26 is provided with an upright flange or the like 36 upon which is mounted a pivoted rod 38 surrounded by a spring 40 which constantly urges the rod in a right direction in FIG. 1 and normally causes the lodgment of a guide at 42 against the stop 44, the guide 42 having a shoulder 43 engaging the stop 44, holding the parts in position and at the same time also holding a like guide member 46. These guide members have depending fingers as shown in FIG. 2 and these abut the edges of the teeth 12 so as to provide for a correct alignment of the toothed edge of the saw with a line of advance of the same by means to be later described. The guides 42 can be flipped up out of the way by pressing a handle 48 on the rod 38 to the left in FIG. 1, disengaging the aforementioned shoulder 43, but when the handle 48 is turned down in order to align the saw blade, the parts will remain in position. By this means the saw blade is accurately positioned with respect to its longitudinal step-by-step motion past the tool 22.

In order to cause the clamp 26, 28, 30 to operate there is provided a self-adjusting cam lock 50 for each leg 28 and 30, this being shown in FIG. 2. Each cam 50 is fixed to a longitudinal rod 51 operated by a handle 54 (see FIG. 1) to increasingly apply pressure to the bars 56 which may be also pivoted on rod 32. Studs 58 on bars 56 bear on the clamping members 28 and 30 by springs 59 and serve to connect clamp-operating bars 56 with clamp arms 28 and 30. Thus it will be seen that when the rod 51 and cam 50 is turned in the appropriate direction, the clamping arms 28 and 30 will be brought downwardly to clamp the blade 10 against member 34. Stop studs 60 which are adjustable can be utilized to preserve a certain spacing of the members 56 and 28 (see FIG. 2) if this should be found desirable.

It is necessary to provide for saw blades of different thicknesses so that the rotary sharpening tool will always contact the blade along a diametric line, and to this end a hand wheel 62 is provided which may be utilized to turn a screw rod 64. Screw rod 64 being threaded in a member 66 fixed to the carriage A will move to the right or left in FIG. 2, pivoting a block 68 which is provided with a finger 70 engaging under a rearward projection on support 34. When rod 64 moves to the right, it pivots block 68 in a counterclockwise direction and raises the support 34. Support 34 however is moved downwardly by gravity upon motion of rod 64 to the left upon turning the thumbpiece 62 in the opposite direction, and this adjusts for the thickness of the saw, maintaining the central plane of the saw in a uniform position with regard to the sharpening tool. Appropriate dowels on carriage A can be utilized for guiding support 34 in order to cause it to move vertically only.

Referring now to FIG. 3 there is shown a flat plate 72 mounted in a groove 71 in a frame member 73 of the machine. This plate is also shown in FIG. 1 and it is provided with a slot 74 which is inclined relative to the length of the plate. Plate 72 is longitudinally movable in its groove by manually operated screw 76 which can be journaled in the frame member 73 and move the plate 72 in and out as it is rotated. When the plate 72 is moved it moves a block 78 right or left. Block 78 carries a stop rod 80 and ahe object of the adjustment of plate 72 is to move rod 80 left or right in order to vary the position of its end 82. As will be explained, there is a member 84 which, moves in one direction under influence of an advancing lever 86 bearing on a block 83 fixed to member 84. The member 84 is, fixed to another member 90 which has a spring (see FIG. 9), the spring being indicated at 88. When the member 84 is moved to the right under influence of the lever 86 and the force of lever 86 is exhausted, then the spring 88 moves the members 84 and 90 to the left but only so far as allowed by the position of the stop face 82 of rod 80. The spring 88 may be housed in the member 90 (see FIG. 1) which is fixed with respect to the member 84, so that the member 84 and the spring-pressed member 90 move as a unit. The member 90 is conveniently arranged to be guided on a rod 92 anchored at both ends to machine frame parts as shown in FIG. 9 at 93. The purpose of the member 84 is to provide for an almost infinitely adjustable motion of member 84 which causes the carriage A a part of which is indicated at 94 in FIG. 2 to move step-by-step longitudinally of the machine according to the adjustment of the rod 80 which constitutes "a forward stop control gauge." Therefore it will be seen that it is possible to provide the carriage with a very small motion or with a relatively large motion, all depending upon the relative adjusted position of the rod 80 under influence of plate 72.

The carriage A has integrally associated therewith a depending longitudinal bar 96 which is gripped by a pair of movable levers or arms 98 and 100. These are mounted to move with the member 84 toward the tool 22 and are mounted on a common pivot 102 (FIG. 2) on a member 103 fixed to member 84. The arms are provided with lower operating pins 104 and 106 (see particularly FIG. 6). These pins are pivotally connected with respect to a couple of operators 108 and 110 in turn pivoted to an oscillatory member 112. This oscillatory member serves to swing the arms 98 and 100 so that finger portions thereof above pivot 102 will grasp dependent bar 96 or release it at the required instant, and this motion is achieved by an arm 114 which is a follower with respect to the cam 116 on the shaft 118 which can be driven as by a motor 120 or turned by a handwheel. As the shaft 118 rotates, the follower arm 114 is of course oscillated. The follower arm 114 is keyed to a shaft 122 upon which the disc 112 is mounted and therefore it is seen that the disc 112 receives the oscillatory motion necessary to cause the arms 98 and 100 to grasp and release the bar 96. The shaft 122 may be mounted in a portion of the frame at 124.

Therefore it will be seen that the arms 98 and 100 are moved bodily as they are supported on member 103 fixed to member 84. This motion is in a direction of advance of the saw past the tool. When the fingers have reached their limit of motion, they open to release member 96 and return to their original position under influence of the spring 88 on the member 90 ready to again grip member 96 for the next advance. At the same time these fingers are also bodily movable in a transverse direction, toward the tool 22.

Now when the adjustment is made with respect to plate 72, it is necessary to also adjust the interval of gripping of the fingers and the operation of the advancing lever 86. This is done by mounting "grip" cam 116, instead of directly on shaft 118, on a sleeve 130. This sleeve is provided with means for rotating it relative to the shaft so as to reposition the grip cam 116 in different positions as required by the other settings of the machine. This adjustment is perhaps best seen in FIG. 4, and comprises a slot 132 in shaft 118 (see FIG. 3) and there being a pin 134 extending transversely through the slot and the sleeve 130. This pin extends into a spiral slot 136 in a fixed collar 137 and is cammed thereby into different angular relationships with respect to shaft 118. The pin 134 is moved relative to shaft 118 along slot 136 by a lever 138 pivoted at 140 on a fixed plate 142. The lever 138 has an operating nose 144 working in a collar 146 on a rod 148, all as shown in FIG. 4, the collar being attached by a block 151 to a hub 149 that holds and secures the pin 134 (FIG. 3).

Referring now to FIG. 1, the lever 138 is manipulatable from the front of the machine. On it there is pivoted a lever 150 which carries a pin 152 which is capable of being dropped into any one of a series of apertures 154 in plate 142 to make and hold the adjustment above described. Also lever 150 is very minutely adjustable by a screw 158 which extends through it and the lever 138 and adjusts the angular relationship between lever 150 and lever 138, the pin 152 riding in a slot in the lever 138 at 160. By this means an almost very infinite adjustment is provided with respect to the pin 134 and therefore the adjustment of sleeve 130 rotatably speaking with respect to the shaft 118, so that the timing of the grip cam and the advancing lever are enabled to be adjusted with respect to the adjustment of the plate 72 in order to very minutely and accurately adjust the operation of the device with respect to the number and size of the teeth to be sharpened.

The lever 86 is operated by means of a special rotary cam 164 on sleeve 130, it being noted that cam 116 is mounted on a barrel 166 which is secured to the sleeve 130. As the shaft 118 rotates therefore, it operates at every revolution, the lever 86 forcing it to pivot in a clockwise direction in FIG. 3 against the action of a return spring 170. In order to smooth the action and maintain the carriage against twisting, the lever 86 can be duplicated as shown in FIG. 4 at 87, the levers 86 and 87 being fixed together on a pivot rod 89. Both levers then bear on the block 83.

There is a cam 174 on shaft 118 which operates a lever 176 in timed relation to cam 164 and lever 176 pivoted on a frame part not shown abuts against the block 178 which forms part of a kind of carriage or support for the bar 96 which is fixed thereto. Parts of this carriage are omitted for clarity. The member 84, etc. rides on rods or bearings 180 in a direction transversely to the direction of motion of the member 84 in FIG. 3. The gripping fingers at 98 and 100, provide a compound motion as described by which means the entire member 94 upon which the saw is mounted is moved both longitudinally and transversely at the same time in order to carry out the double sharpening function which will be described below as to each tooth.

The shaft 118 also drives a sprocket 182 which in turn drives a chain 184 driving a shaft 186 (see particularly FIG. 4). Shaft 186 is provided with a cam track 188 that reciprocates a cam follower 190 mounted on and oscillating a shaft 192 through a universal joint 194 (see FIG. 7). There is a block 198 mounted on a sleeve 200, block 198 having a clutch face 202 to cooperate with a complementary clutch face on a part 204 oscillated by shaft 192. The part 204 is fast to shaft 192 but the sleeve 200 is not. The member 198 is fast to the sleeve 200 on which is mounted a block 206 on which is mounted an upright 208. Upright 208 is provided with a pin 210 which is vertically adjustable in a slot 212 in the member 208. Block 198 has an offset rod 207 passing through block 206 to rock the latter.

The finger 210 extends through a vertical slot 214 in a bracket 216 to which is secured a horizontal pivot support 217 for the tool 22. The pivot support 217 in turn is mounted on a support 218. The pivot support 218 therefore will oscillate on its support 218 according to the motion of the finger 210. Thus it will be seen that as shaft 186 rotates, shaft 192 oscillates, this oscillating the clutch part 198 and in turn oscillating member 208. This oscillates the tool 22 about its axis which is in the center of the support 218 and this causes the tool to twist between the positions which are shown in FIGS. 10, 11 and 12 and FIGS. 13, 14 and 15. The degree of oscillation is changed if the pin 210 should be moved up or down in its slot 214 and likewise the relative oscillatory position of member 198 can be varied by turning member 202 and 198 as well as sleeve 200 on shaft 192.

Furthermore the period of alternation can be varied by moving parts 198 and 204 to or away from each other (see FIG. 8), this being accomplished in a very simple manner by means of a hand lever 220, causing the sleeve 200 and clutch part 198 to move with it. Furthermore the position of the sharpening tool 22 can be adjusted by means of thumb-wheel 222 causing the threaded shaft 224 to move to the right or the left in FIG. 7. Shaft 224 has an arm 225 entering a groove in a part of the member 218 and thus taking with it the member upon which this sharpening tool is mounted.

FIG. 16 shows a cam layout for the device upon which there are provided legends to indicate the operation of the machine. This operation is perhaps better shown in FIGS. 10 to 15 inclusive as to the actual teeth.

The cam arrangements are shown for a five-tooth per inch saw as compared with cam arrangement for a seven tooth per inch saw. The sharpening blade 22 is at the angle shown in FIGS. 10, 11 and 12. As the saw approaches the grinding wheel through the action of cams 116, 164 and 174, the edge 16 will be sharpened. When the furthest motion is achieved as is shown in FIG. 11, the fingers 98 and 100 then cause a longitudinal motion to take place which will cause sharpening of the edge which is indicated at 18 as in FIG. 12.

When the saw is fully retracted (see FIG. 13), the sharpening tool flips, due to the action of finger 210, described above, to the FIG. 13 position. The entire action is then repeated and this time edge 20 is first sharpened and then the edge 14 is sharpened (see particularly FIG. 15). This operation continues for the entire length of the saw and it will be seen that the teeth are all sharpened in one pass of the saw from one end of the machine to the other including the bevels as just described.

It will be seen that the carriage is moved in the compound direction described in order to carry out the sharpening of the teeth without recourse in any way to the teeth themselves so that the motion of the saw is independent of any damage or deformation that may have been made to the teeth. Even if a tooth should have been broken off, the aforementioned and described compound motion of the saw will take place exactly as set by the various gauges. Thus in the event that certain teeth of the saw have been damaged, they will be brought back into exactly similar relationship with respect to the other teeth of the saw contrary to prior art machines in which the saw is indexed by a pawl or the like operating against the teeth of the saw.

The original alignment of the tool 22 with respect to a particular tooth is accomplished by means of a pair of fingers which are indicated in FIG. 1 at 230 and 232. These two fingers are movable as a unit by a wheel 234 and laterally move the saw to align it with the tool before the saw is clamped. Also the finger 230 is movable independently of finger 232 by a hand thumbscrew 236 in order to correctly space the fingers 230 and 232 apart to enter into and conform to the gullets of a pair of spaced teeth.

A brake 240 is adapted to move with the transverse motion of the carriage A and pivots at 242 to brake the carriage at 244. A spring 246 on a bar 248 is gradually compressed on the rightward motion of bar 248 and actuates the brake toward the end of the motion of the carriage. This brake holds the carriage while the gripping arms 98 and 100 are free of the bar 96 so that the carriage is held in its position while the arms 98 and 100 return along bar 96 to then grip it again for the next advancing increment of the carriage A past the tool 22.

Now assuming that there is a saw in the machine and it has run completely through it so that it is ready to take out, it is only necessary to turn the handle 54 in FIG. 1 thereby turning the cams 50 to the releasing position with respect to the transverse members 28 and 30 of the clamp 26. Upon release of this clamp, the finished saw can be easily removed simply by sliding it out from under the clamp member 26. Then another saw is placed in position. Prior to turning the handle 54 back to clamp the fresh saw to be acted upon, it is necessary to rearrange the fingers 230 and 232 somewhat in FIG. 1 so that they will operate in the described manner.

The various adjustments described above to adjust the depth of cut and the degree of index according to the number of teeth per inch, etc. must also be made if the teeth of the saw vary from the teeth of the previous saw which had already been adjusted for.

Then it is only necessary to start the machine in operation. The indexing of the saw according to the number of teeth per inch of course is provided by the motion of the lever 86 in FIG. 3 bearing on block 83 and in turn moving the member 84 and thereby the support 103 and the levers 98 and 100 which under influence of the mechanism shown in FIG. 6 have gripped the bar 96 which is a part of the carriage A and moved it longitudinally one step from right to left in FIG. 1. At the end of this motion the brake 240 takes hold, the levers relax and release the bar and are retracted by the spring 88 in FIG. 9 to their original position. It will be appreciated that these levers move only a slight amount and then they move strictly according to the setting of the plate 72 which moves the stop rod 80 in accordance with the position of this plate 74 as above described. The lever 86 obtains its motion in one direction by means of the shaft 118 and motor 120, and is spring returned.

The feeding or working motion of the carriage of course is transverse to the longitudinal step-by-step motion and this is accomplished as explained by cam 174 acting on the lever 176, thus bodily moving the entire mounting 103, and the arms 98 and 100, to and from the tool.

Therefore it will be seen that when the various settings have been made in accordance with the number of the teeth to be sharpened, all that is necessary to do is to insert the saw, clamp it, and start the machine going, and the operator is not called upon to do anything except to then stop the machine, remove the sharpened blade, and insert a new blade to be worked on.

With reference to FIG. 16 this in general is a cam diagram. In this diagram the continuous line which is marked "C" represents the carriage motion starting from a full retracted position at zero to a most fully forward position toward the grinding wheel represented at "D." The most fully forward positions are shown in FIGS. 11 and 14. The carriage always moves the same, and this is the reference point when going from one size to another.

When setting up for a certain saw, the carriage is manually moved toward the grinding wheel until it reaches the end of its motion as at the point D, and then the grinding wheel is adjusted to the position shown in FIG. 11 or FIG. 14 to take care of the surfaces 16.

To grind surface 14 a resultant motion is needed and this is obtained as a result of the forward motion provided by cam 174 and the lateral motion provided by cam 164.

The line E represents the potential motion derived from cam 164 if all of the cam is used. However, it is only necessary to use part of this motion, depending upon the size of saw being processed. The more teeth to the inch the smaller portion of the cam is used, and this cam can be adjusted relative to the carriage in terms of degrees. The adjustment of the cam has been explained above. The follower at the base of lever 186 is set so that it just contacts cam 160 at 180°, so that the forward and lateral motions occur together to get the condition shown in FIG. 12. For instance, for a seven tooth saw, cam 164 operates from point F to point G, giving a lateral motion (vertical component in the diagram) from F to G. For a five tooth saw, the cam operates from H to J giving an increased lateral motion (vertical component on the diagram).

This diagram has been carefully worked out by making a degree wheel and applying it to the handwheel in FIG. 3 at the right side of the figure. By locating zero on reference point when the carriage began to move toward the grinding wheel, and measuring the motion of every other component on this basis, the diagram has been worked out so that it is much more simple for the operator.

It is believed that the operation of the device will be clear to those skilled in the art but it is particularly to be pointed out that when saws having different teeth are to be sharpened, various settings have to be changed including the position of the bar 72 (see FIG. 1), the position of handle 220 in FIG. 8, the position of the member 138 and in some cases the relative position of the finger 134.

Having thus described my invention and the advantages thereof, I do not wish to be limited to the details herein disclosed, otherwise than as set forth in the claims, but what I claim is:

1. A saw sharpening apparatus comprising a frame, a movable carriage on the frame, saw clamping means on the carriage, a sharpening tool mounted on the frame, means for operating the sharpening tool, and means for moving the carriage in a compound motion toward the sharpening tool and transversely thereof providing for sharpening of beveled teeth, the means traveling the carriage operating directly on the carriage without recourse to the teeth of the saw.

2. A machine for sharpening saws comprising a frame, a carriage on the frame, means to clamp a saw to the carriage, a pair of spaced guide members adapted to contact the teeth of a saw to be sharpened to position the same relative to the carriage, said guide members being movably mounted to be moved out of the path of the saw teeth, means for moving the carriage longitudinally and simultaneously transversely providing a compound motion of the carriage and of the saw clamped thereto, means to operate said carriage traveling means intermittently, said means operating completely independently of the teeth of the saw.

3. Saw sharpening apparatus as recited in claim 1 including means for adjusting said carriage moving means changing the timing thereof for saw teeth of different pitch.

4. The saw sharpening apparatus as recited in claim 1 wherein the carriage moving means comprises in combination a member fixed on the carriage and a movable gripping means for gripping said member, means moving the gripping means in a predetermined direction, means operating said gripping means intermittently to grip or release said member, and means for moving the gripping means longitudinally of the carriage and transversely thereof simultaneously.

5. Saw sharpening apparatus as recited in claim 1 including means for adjusting said carriage moving means changing the timing thereof for saw teeth of different pitch, said last-named means comprising an adjustable stop, means to adjust the stop, the stop being abutted by the carriage to prevent the return of the carriage past a certain predetermined point as called for by the stop.

6. Saw sharpening apparatus as recited in claim 1 included means for adjusting said carriage moving means changing the timing thereof for saw teeth of different pitch, said last-named means comprising an adjustable stop, means to adjust the stop, the stop being abutted by the carriage to prevent the return of the carriage past a certain predetermined point as called for by the stop in a direction away from the tool, the limit of motion of the carriage in the opposite direction being constant.

7. A saw sharpening apparatus comprising a frame, a carriage on the frame, means to clamp a saw on the carriage, a tool for sharpening the teeth, means to move the carriage to and from the tool to sharpen the teeth, adjustable means on the carriage supporting the saw at different predetermined elevations depending upon the thickness of the saw, and means to clamp the saw to said adjustable supporting means.

8. The saw sharpening apparatus as recited in claim 7 wherein said adjusting means comprises a movable support on the carriage, a finger supporting said movable means, said finger being movable, and manual means to elevate or lower said finger to elevate or lower said saw support.

9. A saw sharpening apparatus comprising a carriage for a sharpening tool, means to move the carriage toward and from the sharpening tool longitudinally with respect to the carriage for step-by-step feed, means to clamp the saw to the carriage, said clamping means comprising a cam, an arm actuated by the cam in a clamping direction, a saw clamp, means floatingly connecting the arm and the clamp so that the clamp is also actuated by the cam in a clamping direction, and spring means connecting the saw clamp to the arm so that one can move relative to the other in the opposite direction.

10. A saw sharpening apparatus comprising a movable carriage and a sharpening tool, means to clamp a saw blade to the movable carriage in position for the teeth of the saw to be sharpened by the sharpening tool, means to move the carriage transversely and longitudinally with respect to the saw, said means including a pair of gripping fingers, and means to cause the fingers to move relatively to each other to grip and release the carriage, means to move the gripping fingers in a compound direction both longitudinally and transversely with respect to said carriage, and means to adjust the period of operation of said fingers.

11. The saw sharpening apparatus as recited in claim 10 wherein said last-named means comprises a driving shaft, a sleeve on the shaft, means to adjust the sleeve rotatively relative to the shaft, a cam on the sleeve, said cam operating said gripping fingers to open and close the same at different relationships relative to the action of the carriage moving means, the shaft also operating the carriage moving means.

12. The saw sharpening apparatus as recited in claim 10 wherein said last-named means comprises a driving shaft, a sleeve on the shaft, means to adjust the sleeve rotatively relative to the shaft, a cam on the sleeve, said cam operating said gripping fingers to open and close the same at different relationships relative to the action of the carriage moving means, the shaft also operating the carriage moving means, a second cam on the sleeve, a pivoted lever, said lever being oscillated by said second cam and engaging a member connected with said gripping fingers in order to urge the same together in a predetermined direction.

13. A saw sharpening apparatus comprising a frame, a movable carriage on the frame, saw clamping means on the carriage, a rotary disc sharpening tool mounted on the frame in operative relation to the carriage, means for operating the sharpening tool, and means including a drive shaft for moving the carriage in a compound motion toward the sharpening tool and laterally with respect thereto providing for sharpening of beveled teeth, the means moving the carriage operating intermittently and directly on the carriage without recourse to a saw being sharpened, means mounting the sharpening tool in an angular position with respect to the carriage and saw, means for reversing the angular position of the tool while the carriage is in retracted position as respects the tool, the means for reversing the angle of the tool operating in timed relation to the carriage moving means.

14. The saw sharpening apparatus of claim 13 wherein the means for reversing the tool from one inclination to another comprises a second shaft driven from said drive shaft, a cam on the second shaft, a rod oscillated by the cam, an arm on the rod, a pin on the arm, a bracket connected with respect to said sharpening tool, said pin being engaged with said bracket, said bracket having a slot on it receiving said pin, the latter oscillating with the rod and in turn oscillating the bracket.

15. The saw sharpening apparatus of claim 13 wherein the means for reversing the tool from one inclination to another comprises a second shaft driven from said drive shaft, a cam on the second shaft, a rod oscillated by the cam, an arm on the rod, a pin on the arm, a bracket connected with respect to said sharpening tool, said pin being engaged with said bracket, said bracket having a slot on it receiving said pin, the latter oscillating with the rod and in turn oscillating the bracket, and means for adjusting the position of said pin relative to the rod and said bracket to vary the degree of oscillatory motion of the sharpening tool.

16. The saw sharpening apparatus of claim 13 wherein the means for reversing the tool from one inclination to another comprises a second shaft driven from said drive shaft, a cam on the second shaft, a rod oscillated by the cam, an arm on the rod, a pin on the arm, a bracket connected with respect to said sharpening tool, said pin being engaged with said bracket, said bracket having a slot on it receiving said pin, the latter oscillating with the rod and in turn oscillating the bracket, a sleeve on said rod, the bracket being mounted on the sleeve, a clutch face associated with the sleeve, a second clutch face associated with the rod, said clutch faces having complementary inclined engaging members which are relatively axially adjustable with respect to said rod.

17. A saw sharpening apparatus comprising a frame, a carriage movable on the frame in two directions at right angles to each other, a saw clamp on the carriage, means on the clamp to align the saw in a predetermined relation, a disc sharpening tool in position to sharpen the teeth of a saw in the clamp when the carriage is moved in its two directions which are longitudinally of the line of the teeth of the saw and transversely with respect thereto, means for adjusting the timing of the advance of the saw in a direction longitudinally of the line of teeth, and means to adjust the range of reciprocation of the saw to and from the sharpening tool transversely of the saw, said saw advancing means comprising a pair of fingers, means for opening and closing the fingers intermittently and means on the carriage gripped or released by the fingers, a brake for the carriage, a main shaft including means operating the fingers, a second shaft driven by the main shaft, a cam on the second shaft, an element oscillated by said cam on the second shaft, a rod oscillated by said element, a clutch face secured to said rod and oscillated thereby, a second clutch face free of said rod but oscillated by the first clutch face, a sleeve surrounding the rod, said second clutch face being secured to said sleeve, an arm normal to the rod, means connecting the second clutch face to the rod for oscillating the latter, a slot in said arm, a pin adjustably mounted in said slot for adjustable motion toward and away from said rod, said sharpening tool having a predetermined axis of oscillation, a bracket secured to said tool and adapted to oscillate it as the bracket is oscillated, said bracket having an elongated slot, and said pin extending into said elongated slot.

References Cited by the Examiner
UNITED STATES PATENTS

| | | | |
|---|---|---|---|
| 1,491,706 | 4/24 | Klin | 76—43 X |
| 2,333,298 | 11/43 | Daggett | 76—43 |

GRANVILLE Y. CUSTER, JR., *Primary Examiner.*